United States Patent [19]

Brugel

[11] Patent Number: 5,296,553
[45] Date of Patent: Mar. 22, 1994

[54] PROCESS FOR ISOLATION OF LOW MOLECULAR WEIGHT CHLORINATED AND CHLOROSULFONATED RESINS

[75] Inventor: Edward G. Brugel, Wilmington, Del.

[73] Assignee: E. I. du Pont de Nemours and Company, Wilmington, Del.

[21] Appl. No.: 979,109

[22] Filed: Nov. 20, 1992

[51] Int. Cl.$^5$ .................. C08L 23/28; C08L 23/34
[52] U.S. Cl. .................. 525/194; 525/192; 525/333.9; 525/334.1; 524/527; 524/569; 524/472
[58] Field of Search .................. 525/192, 194

[56] References Cited

U.S. PATENT DOCUMENTS

| | | | |
|---|---|---|---|
| 2,923,979 | 2/1960 | Kalil | 18/57 |
| 3,347,835 | 10/1967 | Lorenz | |
| 3,392,213 | 7/1968 | Berger | 525/243 |
| 4,897,451 | 1/1990 | Nakagawa et al. | 525/192 |

FOREIGN PATENT DOCUMENTS 57-047303 3/1982 Japan.

OTHER PUBLICATIONS

"Chlorosulfonated Polyethylene Elastomers Having Improved Processing"; Research Disclosure, Apr. 1986, p. 176.

Epolene Waxes, Eastman Chemical Company "Low-Molecular-Weight Polyolefin Resins for Industrial Applications," pp. 1-10.

Primary Examiner—Carman J. Seccuro, Jr.
Attorney, Agent, or Firm—Marilyn H. Bromels

[57] ABSTRACT

Low molecular weight olefin resins are blended with small amounts of high molecular weight olefin resins and the blends are chlorinated or chlorosulfonated. Melt and film strengths of the resultant low molecular weight chlorinated and chlorosulfonated resins are thereby increased sufficiently to enable recovery by means of methods which require film or strand formation. The chemical properties and solution characteristics of the blends are substantially maintained compared to those of the low molecular weight chlorinated resins themselves.

18 Claims, No Drawings

PROCESS FOR ISOLATION OF LOW MOLECULAR WEIGHT CHLORINATED AND CHLOROSULFONATED RESINS

BACKGROUND

This invention relates to isolation of low molecular weight chlorinated and chlorosulfonated resin compositions.

Chlorinated and chlorosulfonated polyolefin resins are well-known and widely available compositions which find use as general purpose elastomers as well as in adhesive, ink, and coating formulations. Such compositions are highly resistant to attack by acids, bases, and solvents, and, in addition, they display a high degree of moisture resistance, flexibility, ozone resistance, and excellent adhesion to a wide variety of substrates. The resins are compatible with most components of adhesive and coating formulations and consequently it is possible to impart the chemical resistance, wet adhesion, and elastomeric properties of the resins themselves to these formulations by blending. In addition, particularly in the case of the chlorosulfonated resins, chemical reaction of the chlorinated resin with one or more of the components of the formulation can impart even greater improvements in chemical, physical, and mechanical properties.

The resins are prepared on an industrial scale by chlorination or chlorosulfonation of polyolefins in solution or in aqueous or non-aqueous suspension. Solution processes are preferred because the products obtained have a greater degree of homogeneity than those produced in suspension. The solvents which are used as reaction media for solution polymerization are preferably substantially inert to chlorination and easily removed from the chlorinated polymer product. Isolation is generally effected by use of drum dryers whereby a pair of heated drum rolls situated closely adjacent to one another are fed with a solution of polymeric material which collects in a nip pool above the nip of the rolls. As the solvent evaporates a film of polymeric material is deposited on the drum surface as it contacts the nip pool. The film is usually removed from the rolls by means of a doctor knife and the polymeric product formed is gathered into a rope which is cut into chips for packaging. Alternatively, the polymer solution can be fed to a devolatilizing extruder in which the solvent is removed by means of heat and vacuum, and the resulting polymer extrudate can be recovered in film, powder, or pellet form, or as a strand.

Although these isolation procedures work well for recovery of most chlorinated or chlorosulfonated polymers, these techniques are not suitable for polymers of low molecular weight. Such resins do not have sufficient melt strength to form a film on the drum of a drum dryer. In addition, the film strength of such compositions is insufficient to permit easy release from the drum and in many cases the film tend to gather on the doctor blade resulting in overheating and degradation of the polymer. Further, it is difficult to gather low molecular weight resins into a flexible rope which can be conveyed to a cutter without rupture. Isolation by means of a devolatilizing extruder is also impractical for the low molecular weight chlorinated polymers because these material cannot be formed into a strand, a film, or into pellets due to inadequate film strength. The extrudate cannot be conveyed and must be collected in a container, often resulting in overheating and degradation of the polymer. Thus, it has been necessary to employ other less economical processes for isolation of low molecular weight chlorinated resins, for example precipitation via a non-solvent followed by distillation to remove the solvent and non-solvent, and subsequent drying of the product.

The present invention provides a method for isolation of low molecular weight chlorinated or chlorosulfonated resins wherein the melt strength of the chlorinated olefin polymers is increased without adversely affecting the chemical and physical properties or the solution characteristics of the chlorinated or chlorosulfonated resin products.

SUMMARY OF THE INVENTION

More specifically, this invention is directed to a process for isolation of low molecular weight chlorinated olefin polymers having enhanced melt and film strength which comprises (a) preparing an olefin polymer blend by combining a $C_2$–$C_8$ olefin polymer having a melt index less than 100 g/10 minutes, as determined according to ASTM D 1238, Method E, with a $C_2$–$C_8$ olefin polymer having a weight average molecular weight below about 10,000 in a weight ratio of about 2–15:100 respectively, (b) chlorinating the olefin polymer blend in a halogenated solvent in the presence of a free radical catalyst and a chlorinating agent to produce a chlorinated olefin polymer blend having a chlorine content of 20–70% by weight, and (c) recovering the chlorinated polymer blend.

In a preferred embodiment of the process of the invention the chlorinated resin is a chlorosulfonated polymer which contains up to 10% chemically combined sulfur present in chlorosulfonyl cure sites.

In another preferred embodiment the chlorine content of the chlorinated resin ranges from 25–65% by weight.

Films of the chlorinated or chlorosulfonated low molecular weight resins which are produced upon evaporation of the reaction solvent by means of, for example, either a drum dryer or a devolatilizing extruder, have sufficient melt strength when maintained at a temperature above their softening point or $T_g$ to be conveyed and packaged without breaking. In addition, the chemical and physical properties of the low molecular weight chlorinated olefin resin blends are not adversely affected.

DETAILED DESCRIPTION OF THE INVENTION

In the process of the present invention a low molecular weight olefin polymer having a weight average molecular weight below about 10,000 is blended with a small amount of a high molecular weight olefin polymer having a melt index of less than 100 g/10 minutes, as determined according to ASTM D 1238 Method E. The blend is then co-chlorinated and recovered. Preferably the isolation is accomplished by means of a drum dryer or an extruder. Surprisingly, the presence of a very minor quantity of the high molecular weight fraction results in a substantial increase in the melt and film strengths of the chlorinated low molecular weight product thus enabling isolation of the low molecular weight chlorinated resins by means which require film or strand formation, for example, drum dryers and extruders.

The low molecular weight chlorinated olefin resin products isolated via the process of the present invention may be prepared from a wide variety of low molecular weight olefin polymer base resins which have weight average molecular weights below about 10,000. By olefin polymer is meant homopolymers and copolymers of $C_2$-$C_8$ alpha-monoolefins, including graft copolymers. In particular, the copolymers include copolymers of $C_2$-$C_8$ alpha-monoolefins and carbon monoxide, ethylene vinyl alcohol copolymers, and copolymers of $C_2$-$C_8$ alpha-monoolefins and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, vinyl esters of saturated $C_2$-$C_{18}$ carboxylic acids, and $C_2$-$C_8$ alpha-monoolefins which have been grafted with unsaturated cyclic anhydrides or unsaturated $C_3$-$C_{20}$ mono- or dicarboxylic acids. The copolymers may be bipolymers or higher order copolymers, such as terpolymers or tetrapolymers. Specific examples of these polymers include polyethylene, polypropylene, ethylene vinyl acetate copolymers, ethylene vinyl alcohol copolymers, ethylene acrylic acid copolymers, ethylene methacrylic acid copolymers, ethylene methyl acrylate copolymers, ethylene methyl methacrylate copolymers, ethylene n-butyl methacrylate copolymers, ethylene glycidyl methacrylate copolymers, graft copolymers of ethylene and maleic anhydride, graft copolymers of propylene and maleic anhydride, graft copolymers of propylene and acrylic acid, and copolymers of ethylene with propylene, butene, 3-methyl-1-pentene, or octene. Preferred olefin polymers are polyethylene and copolymers of ethylene and vinyl acetate.

The high molecular weight olefin polymer resin with which the low molecular weight olefin resin is blended may be selected from high molecular weight variants of the above-described olefin polymers which have melt indexes below 100 g/10 minutes, as determined according to ASTM D 1238, Method E. The high molecular weight olefin polymer may be composed of the same monomeric units as the low molecular weight olefin polymer, or the polymers may be composed of different monomeric units in the same or different proportions. Generally, it is preferred that at least one of the monomers is common to both polymers to minimize effects on chemical properties. Chemical and solution properties of the polymer blend are further enhanced when the densities of the high and low molecular weight polymers are closely matched, preferably within about 0.01 g/cc of each other.

Two important features of the present invention relate to the high molecular weight olefin polymer component of the blend. The first of these is the molecular weight of this polymer and the second is the amount of high molecular weight polymer which is present in the blend. The molecular weight of this component must be relatively high in relation to that of the low molecular weight resin in order to realize the improvement in ease of isolation provided by the present invention. This parameter is reflected by the melt index of the high molecular weight polymer which should be less than about 100 g/10 minutes, generally 0.5-20 g/10 minutes, and preferably 2-10 g/10 minutes. If polymers having melt indexes higher than 100 g/10 minutes are utilized as blend components then film and melt strengths of the chlorinated low molecular weight polymer products are not sufficiently enhanced and isolation of the blends on a drum dryer or in an extruder becomes difficult or impossible. Polymers having melt indexes below 0.5 g/10 minutes are undesirable because they are insoluble in the halogenation solvent. With respect to the amount of the high molecular weight olefin polymer necessary to achieve the aims of the present invention it has been found that it is necessary to use from about 2-15 parts of the high molecular weight olefin polymer per 100 parts by weight of the low molecular weight olefin polymer. That is, the weight ratio of high molecular weight olefin polymer to low molecular weight olefin polymer is about 2-15:100. If less than about 2 parts by weight of the high molecular weight polymer is used the chlorinated olefin polymer film produced lacks the strength to be conveyed and packaged. There are also disadvantages to using more than about 15 parts by weight of the high molecular weight polyolefin. The most obvious of these is that the physical properties of the chlorinated blend will differ substantially from those of the chlorinated low molecular weight olefin polymer itself. In particular, the viscosity of solutions based on the chlorinated olefin product increases exponentially as the ratio of the high molecular weight resin to the low molecular weight resin is increased above about 15:100. Since low molecular weight chlorinated olefin polymers are particularly useful in coatings and adhesive applications it is desirable to minimize solution viscosity. Further, minimizing solution viscosity is desirable because it permits formulation of the resins into high solids coatings and adhesives which are environmentally acceptable.

According to the process of the present invention chlorination of the olefin polymer blend takes place in a halogenated solvent, preferably one which is inert, or substantially inert, to chlorination. Examples of suitable solvents include carbon tetrachloride, chloroform, methylene chloride, trichlorofluoromethane, dibromofluoromethane, difluorotrichloroethane, tetrafluorotrichloropropane, pentafluorodichloropropane, monochlorobenzene, dichlorobenzene, fluorobenzene, and monochloromonofluorobenzene. Blending of the low and high molecular weight olefin polymers may take place prior to dissolution in the chlorination solvent or the polymers may be added to the solvent separately.

Chlorination is accomplished by passing a chlorinating agent, especially gaseous chlorine, into the reaction mixture at temperatures of about 50°-150° C., preferably 80°-110° C. In addition, the reaction is preferably run at pressures of 0.10-0.35 MPa. In a further embodiment, chlorosulfonyl reactive sites, in particular cure sites, may be introduced concurrently with polymer backbone chlorination by employing a chlorosulfonating agent, for example either sulfuryl chloride or a mixture of chlorine and sulfur dioxide, as the chlorinating agent. Sufficient chlorinating agent is introduced to provide a level of chlorination as high as desired in the chlorinated polymer product, up to the theoretical limit. In the case of polyethylene, this corresponds to approximately 70 weight percent chlorine. Generally, chlorine levels of 20-70 weight percent, preferably 25-65 weight percent, are desirable to provide products having good chemical resistance, wet adhesion, and solution characteristics. When the process involves chlorosulfonation, enough chlorosulfonating agent is used to provide a chlorosulfonated product containing up to 10 weight percent chemically combined sulfur, preferably about 1-3 weight percent sulfur.

The chlorination reaction is promoted by means of a free radical initiator such as an organic peroxide, an organic hydroperoxide, or an aliphatic azo compound. Typical initiators include 2,2'-azobis(2-methylpropane nitrile), benzoyl peroxide, diisopropylbenzene hydroperoxide, and a,a'-azobis($\alpha,\gamma$-dimethylvaleronitrile). Generally the initiator is present in amounts of 0.1-3% by weight of polymer present.

The chlorination or chlorosulfonation reaction may be carried out as a batch or continuous operation.

Following chlorination or chlorosulfonation the chlorinated or chlorosulfonated product may be isolated from solution as a coherent film or in the form of a strand, pellets, or chips by any conventional means known in the art, preferably by drum dryer or extrusion isolation. When a drum dryer is used the reaction mixture is introduced to the nip of a pair of heated drum dryers. The polymer film which is produced as the solvent evaporates is removed by suitable means such as a doctor knife and gathered into a rope which is easily conveyed. Films of chlorinated polymers having very high glass transition temperatures may be conveyed to a third heated takeoff roll to maintain the temperature of the film above the Tg value while it is being twisted into a rope. A plasticizer, for example a low molecular weight chlorinated paraffin wax, may be added to assist in maintaining the chlorinated resin above its softening point during the recovery phase of the process. The chlorine content of the chlorinated resin may also be adjusted coincidentally with the use of a chlorinated plasticizer to maintain the proper softening point. In the case of extrusion isolation the reaction mixture is introduced into the feed section of a vented screw extruder, for example a devolatilizing extruder. The reaction mixture may optionally be concentrated prior to introduction into the extruder by any of the well-known methods such as thin film evaporation, or vacuum devolatilization. The polymer solution or melt is conveyed from the feed section to the exit by the action of a single or twin screws, especially the non-intermeshing, counter-rotating type. The heat used to evaporate the solvent is introduced by transport through the barrel wall. In addition heat is generated by interaction of the film and the screw. Generally the vented section is connected to a vacuum to increase efficiency of evaporation.

Acid scavengers, for example epoxy-containing compounds, may be added to the polymer solution prior to isolation by either drum dryer or extruder in order to further stabilize the chlorinated resin during the isolation process. Examples of suitable epoxy compounds include condensation products of diglycidylether and bisphenol A, condensation products of epichlorohydrin with diphenols, glycols, or glycerine, epoxidized monounsaturated alkanes, and epoxidized soybean oil.

Prior to the process of the present invention isolation of low molecular weight chlorinated or chlorosulfonated olefin polymers, especially low $T_g$ or very high $T_g$ chlorinated olefin polymers, from solution was not possible using a drum dryer or an extruder due to the low melt and film strengths of such compositions. The present process permits isolation of chlorinated or chlorosulfonated polymers of low molecular weight and low crystallinity. Moreover, it provides compositions which form films having the requisite strength for such isolation techniques while maintaining the chemical and physical properties and the solution characteristics of the chlorinated or chlorosulfonated olefin polymers. The polymers produced by the process of the present invention are useful as base resins for coatings, inks, and adhesive formulations, in particular high solids compositions wherein organic solvent is minimized or eliminated. Consequently, chemical resistance, wet adhesion, and solution characteristics are important factors related to their function.

The invention is further illustrated by the following examples wherein all parts and percentages are by weight.

EXAMPLES

EXAMPLE 1

A stirred 1 liter autoclave was charged with 8.5 liters carbon tetrachloride, 1.96 lb. (0.89 kg) low molecular weight polyethylene having a weight average molecular weight of 2500, (density 0.92 g/cc), and 0.04 lb. (0.02 kg) high molecular weight polyethylene having a melt index of 1.7 (density 0.918 g/cc). The autoclave was closed and heated to 110° C. and pressurized to 30-35 psi (0.21-0.24 MPa) to dissolve the polyethylenes. An initiator solution [1% 2,2'-azobis-(2-methylpropanenitrile) in chloroform] was added at a rate of 3 ml per minute throughout the remainder of the reaction. The temperature was reduced to 105° C. and chlorine was introduced at a rate of 1 lb./hour (0.45 kg/hour). After 15 minutes the reaction temperature was lowered to 85°-90° C. and 1245 ml of sulfuryl chloride was introduced at a rate of 40 ml/minute. After 1.6 lbs. (0.73 kg) chlorine had been added the pressure on the reactor was released and the sample was degassed at about 100°-75° C. A stabilizer solution of Epon ®828 epoxy resin (1% in carbon tetrachloride) was added in an amount of 1 kg. The solution was filtered and the polymer was isolated by drum drying. The product formed a coherent film on the drum dryer which could be gathered into a rope and conveyed to a cutter. The product contained 50.17% chlorine and 1.64% sulfur. A 20% solution of the polymer in toluene had a solution viscosity of 325 centipoise.

EXAMPLE 2

Example 1 was repeated using substantially the same procedure, equipment, and amounts of reactants described in Example 1 except that the proportions of high and low molecular weight polyethylene were as shown in Table I. Chlorine and sulfur contents of the products, as well as viscosities of 20% solutions of the products in toluene, are also shown in Table I. All of the resultant chlorosulfonated resins were isolated with ease on a drum dryer. All formed flexible films which could be readily wound onto the take-up rolls.

TABLE I

| Sample | Amount Low M.W. PE (Kg) | Amount High M.W. PE (Kg) | Cl (%) | S (%) | Viscosity (Centipoise) |
|---|---|---|---|---|---|
| 2A | .86 | .05 | 50.30 | 1.03 | 477 |
| 2B | .83 | .08 | 49.83 | 1.80 | 4550 |
| 2C | .79 | 0.11 | 50.1 | 1.5 | 6100 |

COMPARATIVE EXAMPLE 1

Example 1 was repeated using the same equipment, conditions, and amounts of reactants described therein except that 2.0 lbs. (0.91 kg) of the low molecular weight polyethylene having $M_w$ of 2500 was used in place of the blend of low and high molecular weight polyethylenes. The product contained 50.1% chlorine and 1.47% sulfur. When isolation of the filtered reaction solution was attempted on a drum dryer the film continually broke and could not be wrapped onto the take-up roll. A 20% solution of the product in toluene had a solution viscosity of 350 centipoise.

COMPARATIVE EXAMPLE 2

Example 1 was repeated using the same equipment, conditions, and amounts of reactants described therein except that 1.66 lbs. (0.75 kg) of the low molecular weight polyethylene and 0.34 lbs. (0.15 kg) of the high molecular weight polymer was used. The polymer product contained 50.6% chlorine and 1.5% sulfur. Although the material could be isolated on a drum dryer as a film, a 20% solution of the product in toluene had a solution viscosity of 13,000 centipoise. The high solution viscosity of this composition, which results from the presence of more than 15 parts high molecular weight polymer per 100 parts of low molecular weight polymer, makes this product unacceptable for preparation of high solids coatings.

EXAMPLE 3

A stirred 40 liter autoclave was charged with 13 liters carbon tetrachloride, 3.6 lbs (1.63 kg) low molecular weight polyethylene having a weight average molecular weight of 2500 (density 0.92 g/cc), and 0.40 lbs. (0.18 kg) high molecular weight polyethylene having a melt index of 1.7 (density 0.918 g/cc). The autoclave was closed and heated to 110° C. and pressurized to 30–35 psig (0.21–0.24 MPa) to dissolve the polyethylenes. An initiator solution [1% 2,2'-azobis-(2-methylpropanenitrile) in chloroform] was added at a rate of 3.5 ml per minute throughout the remainder of the reaction. The temperature was reduced to 105° C. and chlorine was introduced at a rate of 1.5 lb./hour (0.68 kg/hour). After a total of 13.02 lbs. (5.91 kg) chlorine had been passed into the reaction mixture the pressure on the reactor was released and the sample was degassed at about 100°–175° C. Epon ®828 epoxy resin stabilizer (1% in carbon tetrachloride), 0.04 lbs. (0.18 g), was added to the reaction mixture. Prior to drum drying, Cereclor 42 ® plasticizer (a chlorinated low molecular weight chlorinated paraffin wax), 8%, based on the total weight of chlorinated polymer, was added to the reaction mixture. The reaction mixture was filtered and the chlorinated polymer product was isolated by drum drying. The product formed a coherent film on the drum dryer which could be gathered into a rope and conveyed to a cutter. The product contained 62.5% chlorine. A 20% solution of the product in toluene had a solution viscosity of 10 centipoise.

EXAMPLE 4

Example 3 was repeated using substantially the same procedure, equipment, and amounts of reactants described in Example 3 except that the proportions of high and low molecular weight polyethylene were as shown in Table II. Chlorine contents and solution viscosities of 20% solutions of the products in toluene are also shown in Table II. The resultant chlorinated resins were easily isolated on a drum dryer.

TABLE II

| Sample | Amount Low M.W. PE (Kg) | Amount High M.W. PE (Kg) | Chlorine (%) | Viscosity (Centipoise) |
|---|---|---|---|---|
| 4A | 1.74 | 0.07 | 63.1 | 10 |
| 4B | 1.72 | 0.10 | 62.9 | 9 |

COMPARATIVE EXAMPLE 3

Example 3 was repeated using the same equipment, conditions, and amounts of reactants described therein except that 4.0 lbs. (1.81 kg) of the low molecular weight polyethylene having $M_w$ of 2500 was used in place of the blend of low and high molecular weight polyethylenes. The product contained 62.2% chlorine. When isolation of the filtered reaction solution was attempted on a drum dryer the product would not form a coherent film on the drum nor could a film be pulled to the take-up rollers. A 20% solution of the product in toluene had a solution viscosity of 9 centipoise.

COMPARATIVE EXAMPLE 4

Example 3 was repeated using the same equipment, conditions, and amounts of reactants described therein except that 3.36 lbs. (1.52 kg) of the low molecular weight polyethylene and 0.64 lbs. (0.29 kg) of the high molecular weight polyethylene was used. The product contained 63.2% chlorine. Although the product could be isolated on a drum dryer, a 20% solution of the product in toluene had a solution viscosity of 20 centipoise. Chlorinated compositions of this type are used in sprayable high solids formulations where small changes in solution viscosity dramatically impact application performance. Therefore, the doubling of the solution viscosity of this composition, compared to the solution viscosities of the products of Examples 3 and 4, indicates an unacceptable degree of change in solution characteristics.

EXAMPLE 5

A stirred 1 liter autoclave was charged with 500 ml monochloromonofluorobenzene, 45 g of an ethylene/acrylic acid copolymer (5 weight % acrylic acid, density 0.92 g/cc) having a weight average molecular weight of about 2500, and 5 g of a polyethylene resin having a melt index of 1.7 g/10 minutes. The autoclave was closed and heated to 110° C. and pressurized to 30–35 psig (0.21–0.24 MPa) to dissolve the polymers. An initiator solution [1% 2,2'-azobis-(2-methylpropanenitrile) in chloroform] was added at a rate of 2 ml per minute throughout the remainder of the reaction. The temperature was reduced to 105° C. and chlorine was introduced at a rate of 0.8 g/minute. After a total of 160 g chlorine had been passed into the reaction mixture the pressure on the reactor was released and the sample was degassed at about 100°–75° C. Epon ®828 epoxy resin stabilizer, 18 g, was added to the reaction mixture. Prior to drying, Cereclor ®42 plasticizer, a chlorinated paraffin wax, was added in an amount of 8%, based on the total weight of chlorinated polymer. The solution was filtered and isolated on a drum dryer. The product formed a coherent film on the drum dryer which could be gathered into a rope and conveyed to a cutter. The product contained 67% chlorine. A 20% solution of the polymer in toluene had a solution viscosity of 25 centipoise.

EXAMPLE 6

A stirred 1 liter autoclave was charged with 500 ml fluorobenzene, 45 g of an ethylene/acrylic acid copolymer (5 wt. % acrylic acid, density 0.92 g/cc) having a weight average molecular weight of about 2500, and 5 g of an ethylene methacrylic acid copolymer (9 wt % methacrylic acid, melt index 10 g/10 minutes). The autoclave was closed and heated to 110° C. and pressurized to 30-35 psig (0.21-0.24 MPa) to dissolve the polymers. An initiator solution [1% 2,2'-azobis-(2-methylpropanenitrile) in chloroform] was added at a rate of 2 ml per minute throughout the remainder of the reaction. The temperature was reduced to 105° C. and chlorine was introduced at a rate of 0.8 g/minute. After a total of 160 g chlorine had been passed into the reaction mixture the pressure on the reactor was released and the sample was degassed at about 100°-75° C. Epon ®828 epoxy resin stabilizer, 18 g, was added to the reaction mixture. Prior to drying, Cereclor ®42 plasticizer, a chlorinated paraffin wax, was added in an amount of 8%, based on the total weight of chlorinated polymer. The solution was filtered and isolated on a drum dryer. The product formed a coherent film on the drum dryer which could be gathered into a rope and conveyed to a cutter. The product contained 64.3% chlorine.

EXAMPLE 7

A stirred 40 liter autoclave was charged with 8.5 liters carbon tetrachloride, 3.80 lbs (1.72 kg) polyethylene having a weight average molecular weight of about 2500, (density 0.92 g/cc), and 0.20 lb. (0.09 kg) polyethylene having a melt index of 1.7 (density 0.918 g/cc). The autoclave was closed and heated to 110° C. and pressurized to 30-35 psi (0.21-0.24 MPa) to dissolve the polyethylenes. An initiator solution [1% 2,2'-azobis-(2-methylpropanenitrile) in chloroform] was added at a rate of 3 ml per minute throughout the remainder of the reaction. The temperature was reduced to 105° C. and addition of chlorine was begun. A total of 13.62 lbs. (6.18 kg) of chlorine was passed into the reaction at a rate of 1 lb/hr. (0.45 kg/hour). After the addition of chlorine was complete the pressure on the reactor was released and the sample was degassed at about 100°-75° C. A stabilizer solution of Epon ®828 epoxy resin (1% in carbon tetrachloride) was added in an amount of 1 kg. A chlorinated paraffin plasticizer, Cereclor 42, was added to the solution in an amount of 8%, based on the total weight of chlorinated polyethylene. The solution was filtered and the product was isolated as strands via a 28 mm twin screw devolatilizing extruder incorporating a non-intermeshing screw design. The product was cooled, chopped and packaged. A 20% solution of the polymer in toluene had a solution viscosity of 13 centipoise. The chlorine content of the product, prior to addition of plasticizer, was 62.5%.

I claim:

1. A process for isolation of low molecular weight chlorinated olefin polymers having enhanced melt and film strength which comprises
    (a) preparing an olefin polymer blend by combining a $C_2$-$C_8$ olefin polymer having a melt index of 0.5-20 g/10 minutes, as determined according to ASTM D 1238, Method E, with a $C_2$-$C_8$ olefin polymer having a weight average molecular weight below about 10,000 in a weight ratio of about 2-15:100 respectively,
    (b) chlorinating the olefin polymer blend in a halogenated solvent in the presence of a free radical catalyst and a chlorinating agent to produce a chlorinated olefin polymer blend having a chlorine content of 20-70% by weight, and
    (c) recovering the chlorinated polymer blend.

2. The process of claim 1 wherein the chlorinated olefin polymer blend of step (b) is recovered by introducing the blend and the halogenated solvent of step (b) to the nip of a drum dryer, forming a film of the chlorinated olefin polymer blend on the drum dryer, and separating the film from the drum.

3. The process of claim 1 wherein the chlorinated olefin polymer blend of step (b) is recovered by introducing the blend in the halogenated solvent of step (b) or as a concentrated polymer melt to a vented screw extruder and extruding chlorinated olefin blend which is substantially free of solvent.

4. The process of claim 1 wherein the chlorinating agent is gaseous chlorine.

5. The process of claim 1 wherein the chlorinating agent is a chlorosulfonating agent.

6. The process of claim 1 wherein the olefin polymer is a $C_2$-$C_8$ alpha-monoolefin homopolymer, a copolymer of a $C_2$-$C_8$ alpha-monoolefin and carbon monoxide, an ethylene vinyl alcohol copolymer, or a copolymer of a $C_2$-$C_8$ alpha-monoolefin and at least one ethylenically unsaturated monomer selected from the group consisting of $C_3$-$C_{10}$ alpha monoolefins, $C_1$-$C_{12}$ alkyl esters of unsaturated $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, vinyl esters of saturated $C_2$-$C_{18}$ carboxylic acids, and $C_2$-$C_8$ alpha-monoolefins which have been grafted with unsaturated cyclic anhydrides or unsaturated $C_3$-$C_{20}$ mono-or dicarboxylic acids.

7. The process of claim 1 wherein the olefin polymer having a weight average molecular weight below about 10,000 is polyethylene.

8. The process of claim 1 wherein the olefin polymer having a weight average molecular weight below about 10,000 is an ethylene vinyl acetate copolymer.

9. The process of claim 1 wherein the olefin polymer having a weight average molecular weight below about 10,000 is a copolymer of ethylene and acrylic acid.

10. The process of claim 1 wherein the olefin polymer having a weight average molecular weight below about 10,000 is a copolymer of ethylene and methacrylic acid.

11. The process of claim 1, wherein the olefin polymer having a melt index of 0.5-20 g/10 minutes is polyethylene.

12. The process of claim 1, wherein the olefin polymer having a melt index of 0.5-20 g/10 minutes is an ethylene vinyl acetate copolymer.

13. The process of claim 1, wherein the olefin polymer having a melt index of 0.5-20 g/10 minutes is a copolymer of ethylene and acrylic acid.

14. The process of claim 1 wherein the chlorinated olefin polymer blend has a chlorine content of 25-65 weight percent.

15. The process of claim 1 wherein the melt index of the $C_2$-$C_8$ polyolefin having a melt index of 0.5-20 g/10 minutes is 2-10 g/10 minutes.

16. The process of claim 1 wherein the chlorinated polymer blend has a chemically combined sulfur content of 1-3 weight percent.

17. The process of claim 1 wherein there is additionally present a chlorinated paraffin wax plasticizer.

18. The process of claim 1 wherein the densities of the polyolefin having a melt index of 0.5-20 g/10 minutes and the $C_2$-$C_8$ olefin polymer having a weight average molecular weight below about 10,000 are within about 0.01 g/cc of each other.

* * * * *